(12) United States Patent
Calpe Maravilla et al.

(10) Patent No.: US 10,419,741 B2
(45) Date of Patent: Sep. 17, 2019

(54) SYSTEMS AND METHODS FOR COMPRESSION OF THREE DIMENSIONAL DEPTH SENSING

(71) Applicant: ANALOG DEVICES GLOBAL UNLIMITED COMPANY, Hamilton (BM)

(72) Inventors: Javier Calpe Maravilla, Alegemesi (ES); Eoin English, Pallasgreen (IE); Maurizio Zecchini, San Jose, CA (US); Chao Wang, Milpitas, CA (US)

(73) Assignee: ANALOG DEVICES GLOBAL UNLIMITED COMPANY, Hamilton (BM)

( * ) Notice: Subject to any disclaimer, the term of this patent is extended or adjusted under 35 U.S.C. 154(b) by 0 days.

(21) Appl. No.: 15/442,418

(22) Filed: Feb. 24, 2017

(65) Prior Publication Data
US 2018/0249143 A1    Aug. 30, 2018

(51) Int. Cl.
| | |
|---|---|
| *H04N 13/271* | (2018.01) |
| *H04N 13/296* | (2018.01) |
| *G01S 7/481* | (2006.01) |
| *G01S 17/89* | (2006.01) |
| *G01S 17/02* | (2006.01) |
| *G01S 17/42* | (2006.01) |
| *G01S 7/48* | (2006.01) |
| *G01S 7/486* | (2006.01) |
| *H04N 13/00* | (2018.01) |

(52) U.S. Cl.
CPC ......... *H04N 13/271* (2018.05); *G01S 7/4808* (2013.01); *G01S 7/4814* (2013.01); *G01S 7/4817* (2013.01); *G01S 7/4868* (2013.01); *G01S 17/023* (2013.01); *G01S 17/42* (2013.01); *G01S 17/89* (2013.01); *H04N 13/296* (2018.05); *H04N 2013/0092* (2013.01); *H04N 2213/003* (2013.01)

(58) Field of Classification Search
CPC . G06T 2207/10016; G06T 2207/10012; G06T 7/571; G06T 7/194; G06T 17/00; H04N 5/351; H04N 5/23212
USPC ........................................................ 348/135
See application file for complete search history.

(56) References Cited

U.S. PATENT DOCUMENTS

| | | |
|---|---|---|
| 9,267,787 B2 | 2/2016 | Shpunt et al. |
| 9,965,865 B1 * | 5/2018 | Agrawal ................. G06T 7/194 |

(Continued)

FOREIGN PATENT DOCUMENTS

| | | |
|---|---|---|
| WO | 2009/142443 | 11/2009 |
| WO | 2014/154839 | 10/2014 |

OTHER PUBLICATIONS

Ming-Jie Sun et al., *Single-Pixel 3D Imaging with Time-Based Depth Resolution*, arXiv:1603.00726v1 [physics.optics] Mar. 2, 2016, 10 pages.

*Primary Examiner* — Behrooz M Senfi
(74) *Attorney, Agent, or Firm* — Patent Capital Group

(57) ABSTRACT

Aspects of the embodiments are directed to time-of-flight (ToF) imaging systems and method for image processing. The ToF imaging system can include a depth sensor; a light steering device; a photodetector; and an image processor. The ToF imaging system can be configured to acquiring a first image of a scene by the photodetector; identifying one or more regions of interest of the scene from the first image; and capturing a depth map of at least one of the one or more regions of interest.

21 Claims, 17 Drawing Sheets

(56) References Cited

U.S. PATENT DOCUMENTS

| | | | |
|---|---|---|---|
| 10,217,195 B1* | 2/2019 | Agrawal | G06T 5/003 |
| 2010/0284568 A1* | 11/2010 | Tojo | G06K 9/00255 |
| | | | 382/103 |
| 2011/0273320 A1* | 11/2011 | Nogueira-Nine | G01K 11/006 |
| | | | 342/27 |
| 2012/0051625 A1* | 3/2012 | Appia | H04N 13/026 |
| | | | 382/154 |
| 2012/0326959 A1 | 12/2012 | Murthi et al. | |
| 2013/0207970 A1 | 8/2013 | Shpunt et al. | |
| 2014/0169701 A1 | 6/2014 | Cui | |
| 2014/0375820 A1 | 12/2014 | Priyantha et al. | |
| 2016/0093234 A1* | 3/2016 | Tse | G06K 9/00201 |
| | | | 382/106 |
| 2016/0127664 A1* | 5/2016 | Bruder | G01S 7/4816 |
| | | | 463/30 |
| 2016/0150219 A1 | 5/2016 | Gordon et al. | |
| 2016/0330433 A1 | 11/2016 | Shen et al. | |
| 2016/0364087 A1* | 12/2016 | Thompson | G06F 3/0481 |
| 2017/0088147 A1* | 3/2017 | Tentinger | B60K 35/00 |
| 2018/0227562 A1* | 8/2018 | Bleyer | H04N 5/3532 |

\* cited by examiner

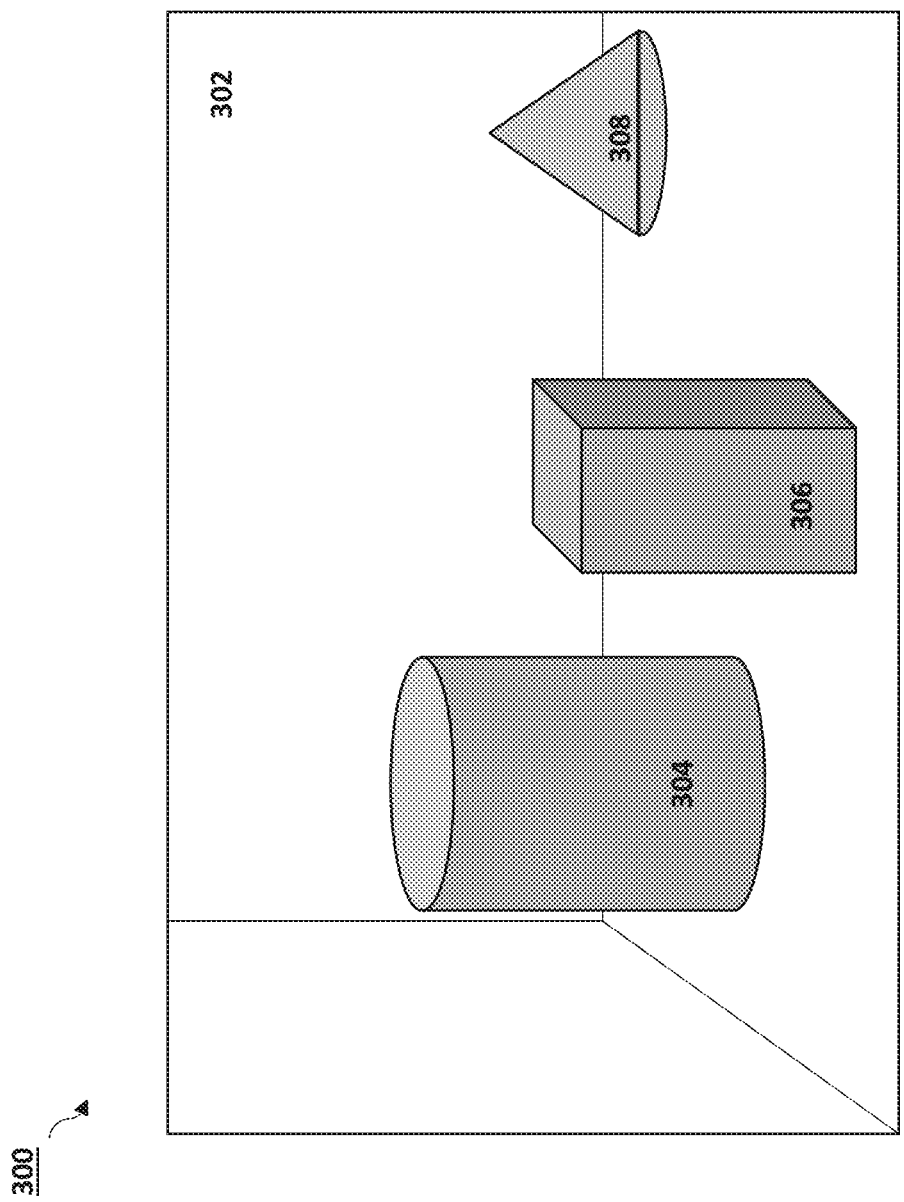

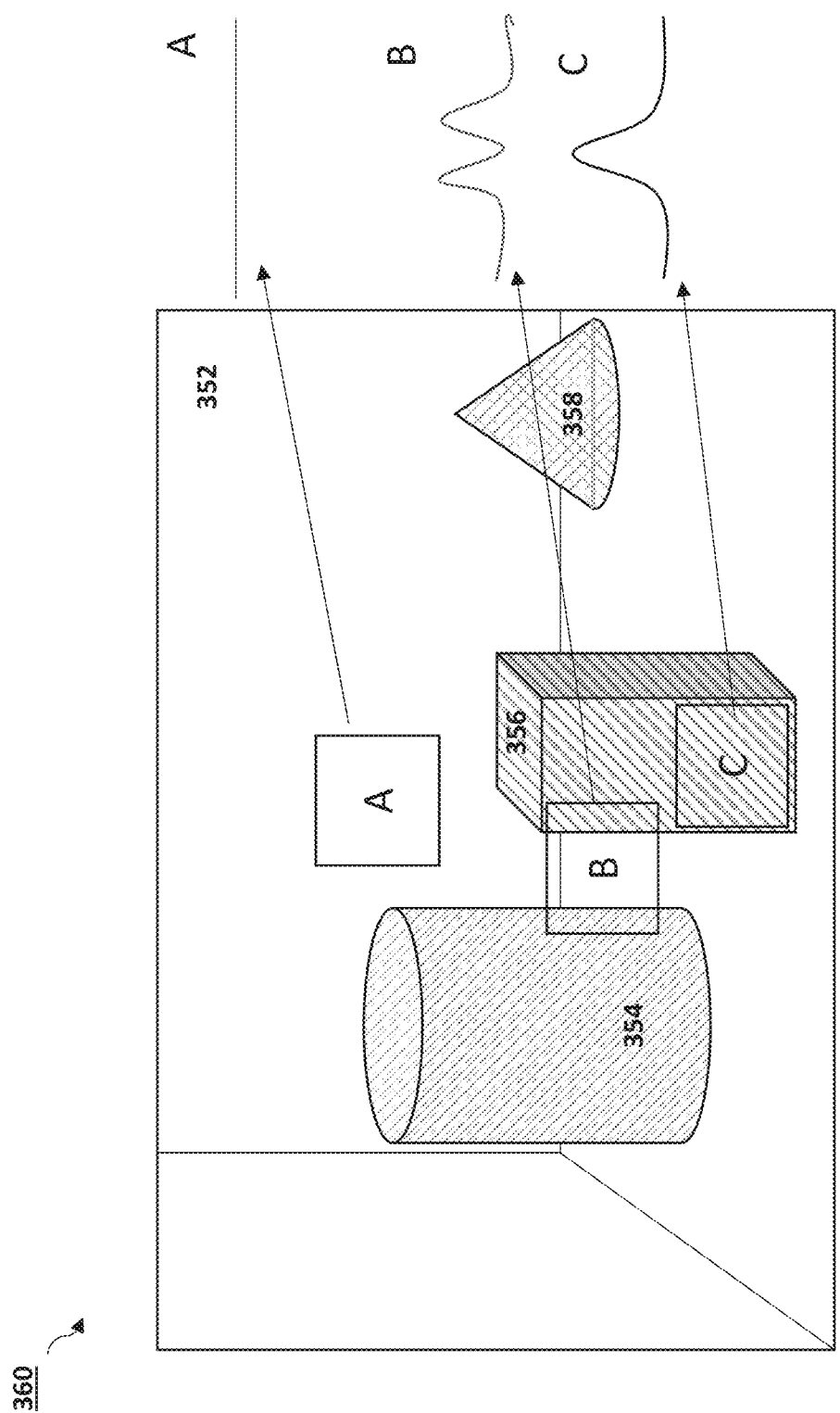

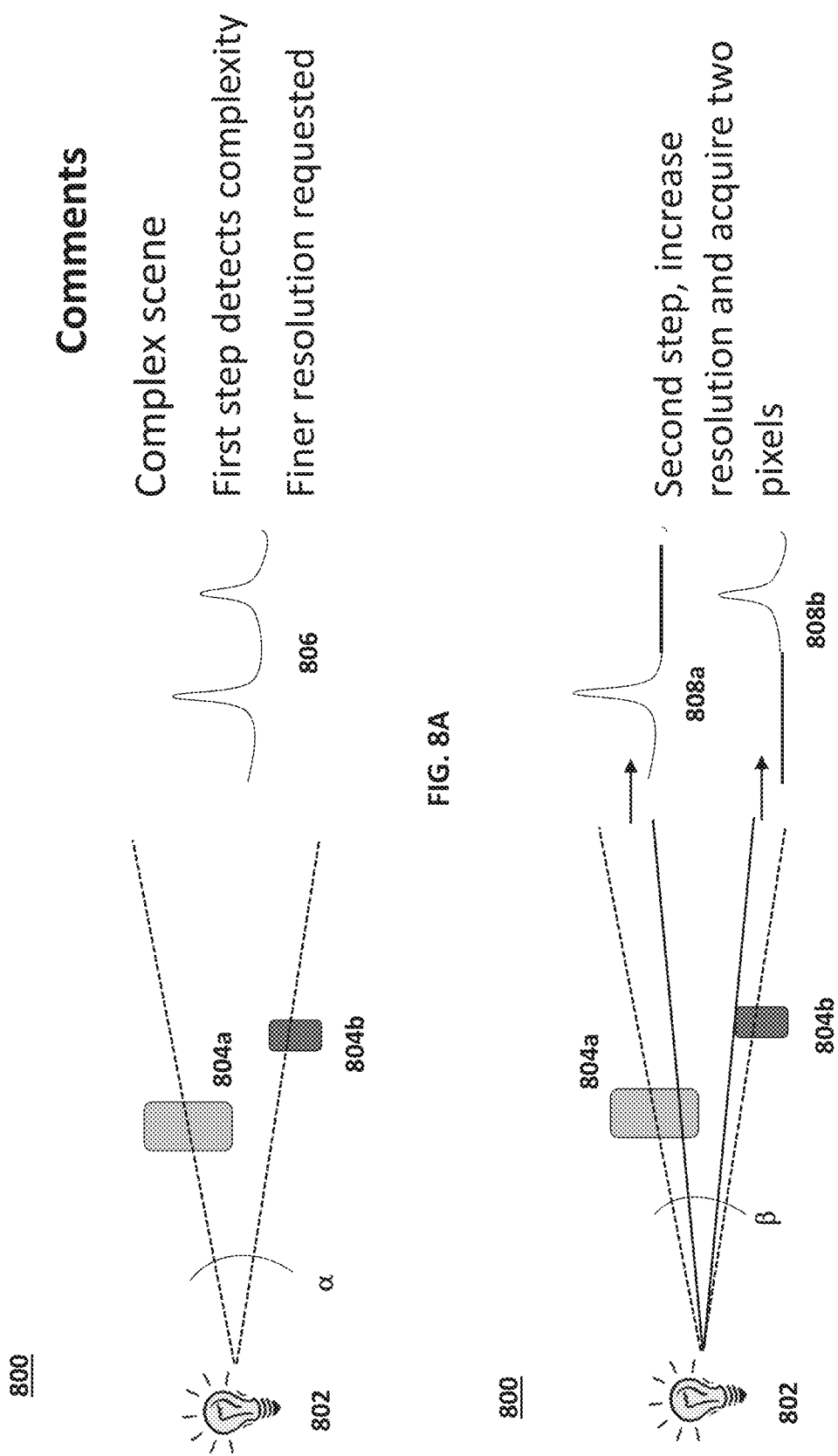

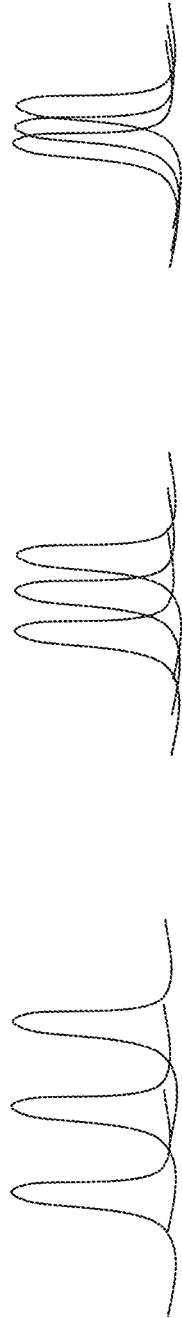

| No overlap | Moderate overlap | Significant overlap |
|---|---|---|
| The information in the central pixel has nothing from its neighbors | The information in the central pixel is heavily influenced by its neighbors | The information in the central pixel is basically contained in its neighbors |
| One way to extract information finer than the resolution is interpolation | If the central peak shows the presence of two objects, the boundary can be inferred by looking at neighboring pixels | The information can be decoupled (deconvolved) from the 3 acquisitions and obtain a finer step |

FIG. 11

SYSTEMS AND METHODS FOR COMPRESSION OF THREE DIMENSIONAL DEPTH SENSING

FIELD

This disclosure pertains to systems and methods for compression of three dimensional depth sensing.

BACKGROUND

Depth sensing imaging systems can use coherent light sources and light steering devices to illuminate a scene to acquire depth estimations. Three-dimensional depth maps can take time and can take up important resources, such as light emission power and processing resources.

SUMMARY

Aspects of the embodiments are directed to time-of-flight (ToF) imaging systems and methods for operating the same. For example, a method of operating a ToF imaging system can include acquiring a first image of a scene; identifying one or more regions of interest of the scene from the first image; and capturing a depth map of at least one of the one or more regions of interest.

A time-of-flight imaging system can include a depth sensor; a light steering device; a photodetector; and an image processor. The time-of-flight imaging system configured to acquiring a first image of a scene by the photodetector; identifying one or more regions of interest of the scene from the first image; and capturing a depth map of at least one of the one or more regions of interest.

BRIEF DESCRIPTION OF THE DRAWINGS

FIG. 3A is a schematic diagram of an image captured by a 2D imaging device in accordance with embodiments of the present disclosure.

FIG. 3C is a schematic diagram illustrating example reflected signals from different parts of a scene in accordance with embodiments of the present disclosure.

FIG. 8A is a schematic diagram illustrating a scene with two objects are different depths in accordance with embodiments of the present disclosure.

FIG. 8B is a schematic diagram illustrating the scene where the light emitter emits light at a smaller solid angle than in FIG. 8A in accordance with embodiments of the present disclosure.

FIG. 11 illustrates three depth signals representing neighboring pixel values in accordance with embodiments of the present disclosure.

DETAILED DESCRIPTION

This disclosure describes systems and methods that use two-dimensional (2D) image data, e.g. by scene segmentation, to increase sensing efficiency in acquiring three dimensional (3D) depth points, e.g. increase spatial resolution, reducing the power or scan time. Aspects of the embodiments use 2D and 3D information and/or heuristics to increase acquisition rates in time-of-flight depth sensing, increase the resolution of depth maps, and/or reduce power utilization in acquiring depth maps.

Figure 1:
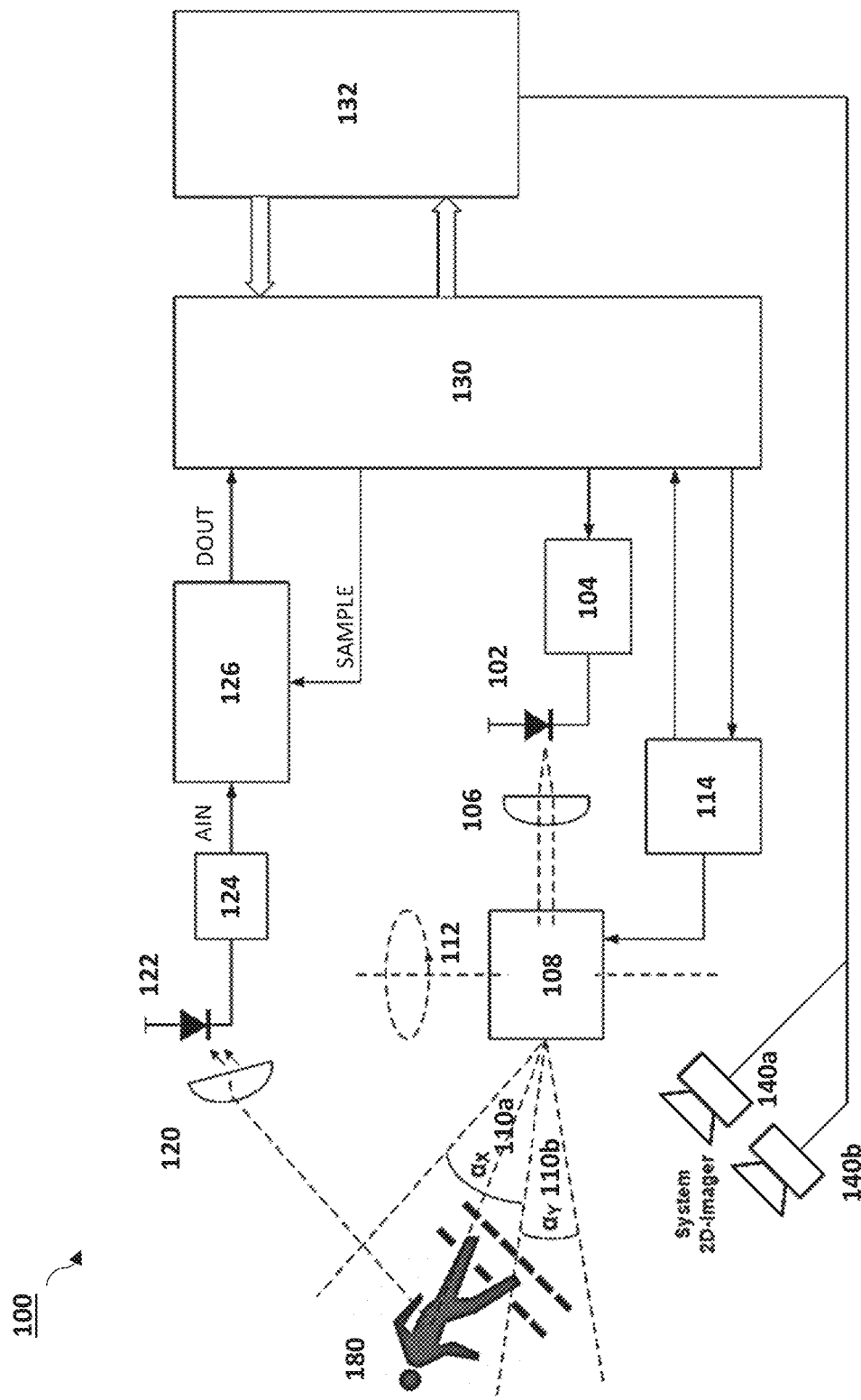
FIG. 1 is a schematic diagram of an example imaging system in accordance with embodiments of the present disclosure.

FIG. 1 is a schematic diagram of an example imaging system 100 in accordance with embodiments of the present disclosure. The imaging system 100 includes a light emitter 102. Light emitter 102 can be a light producing device that produces a coherent light in the infrared (IR) range. Some examples of light emitters 102 include laser diodes, solid-state lasers, vertical cavity surface-emitting laser (VCSEL), narrow angle light emitting diodes (LEDs), etc. The imaging system 100 can also include a light emitter driver 104. The light emitter driver 104 can drive the light emitter 102 with a very short (e.g., nanosecond range), high energy pulse. Some examples of light emitter drivers 104 include gallium nitride (GaN) field effect transistors (FETs), dedicated high speed integrated circuits (ICs), application specific integrated circuits (ASICs), etc. In some embodiments, the driver 104 and light emitter 102 can be a single device.

The imaging system 100 can also include a collimating lens 106. The collimating lens 106 makes sure that the angle of each emission of emitted light is as narrow as possible to improve the spatial resolution and to make sure all the emitted light is transferred through the light steering device 108. The light steering device 108 allows collimated light to be steered, in a given field of view (FOV), within a certain angle αX and αY. Light steering device 108 can be a 2D light steering device, where light can be diverted horizontally (110a, αX) and vertically (110b, αY). In embodiments, light steering device 108 can be a 1D device that can steer light only in one direction (αX or αY). Typically a light steering device 108 is electrically controlled to change deflection angle. Some examples of a steering device are: MEMS mirrors, acoustic crystal modulators, liquid crystal waveguides, photonic phase array or other types of light steering devices. In some embodiments, the light steering device 108 can be assembled in a rotating platform (112) to cover an up to 360 degrees horizontal field of view.

In embodiments, the collimating lens 106 can be adjusted to change the beam area. Changing the beam area permits the imaging system 100 to scan a scene using a coarse beam area for faster scanning and lower resolution. The beam area can also be adjusted to a finer beam area for higher resolution scans. The use of an adjustable beam area is discussed in more detail in FIG. 8A-B.

The imaging device 100 can include a light steering device controller and driver 114. The light steering device controller 114 can provide the necessary voltages and signals to control the light steering device deflection angle. The light steering device controller 114 may also use feedback signals to know the current deflection and apply corrections. Typically the light steering device controller 114 is a specialized IC designed for a specific steering device 108.

The imaging system can also include a collecting lens 120. The highly focused light projected in the FOV (110*a* and 110*b*) scatters when impinging an object (180). The collecting lens 120 allows as much as possible light to be directed in the active area of the photosensitive element 122. Photosensitive element 122 can be a device that transforms light received in an active area into an electrical signal that can be used for image detection. Some examples of photosensitive elements include photodetectors, photodiodes (PDs), avalanche photodiodes (APDs), single-photon avalanche photodiode (SPADs), photomultipliers (PMTs).

An analog front end 124 provides conditioning for the electrical signal generated by the photodetector before reaching the analog to digital converter (ADC) element. Conditioning can include amplification, shaping, filtering, impedance matching and amplitude control. Depending on the photodetector used not all the described signal conditionings are required.

The imaging system 100 can include a time-of-flight (ToF) measurement unit 126. In embodiments, ToF measurement unit 126 can include a sampling system. The ToF measurement unit uses START and STOP signals to define the time range to acquire the incoming light. This is used to measure the time taken by the pulse sent from the light emitter 102 to reach the object 180 and reflect back to the photosensitive element 122. The measurement can be performed using an Analog to Digital Converter (ADC). This block provides one or more ToF measurements to a 3D sensing processor 130 or application processor (132) for further data processing and visualization/actions The 3D sensing processor 130 is a dedicated processor controlling the 3D sensing system operations such as: Generating timings, providing activation pulse for the light emitter, collecting ToF measurements in a buffer, performing signal processing, sending collected measurements to the application processor, performing calibrations.

The application processor 132 can be a processor available in the system (e.g. a CPU or baseband processor). The application processor 132 controls the activation/deactivation of the 3D sensing system 130 and uses the 3D data to perform specific tasks such as interacting with the User Interface, detecting objects, navigating. In some cases the application processor 132 uses the 2D information from the system imager (140*a*) to augment the information received from the 3D system for additional inferences. In some embodiments, 3D sensing processor 130 and application processor 132 can be implemented on the same device.

In embodiments, the imaging system can include a 2D imager 140*a*. The 2D imager 140*a* can capture still images or videos. The information provided by the 2D imager 140*a* can augment the information provided by the 3D sensing or can be used to correlate 3D points in 2D space. In embodiments, the imaging system 100 can include a secondary 2D imager 140*b*. The imaging system 100 can have multiple imagers that can be used to spot different areas or can be used stereoscopically to provide 3D information, in this last case the system can take advantage of the two 3D detection systems according to the mode of operation (e.g., at a close distance or for lower depth accuracy an imager based 3D detection system could be preferred while at long distance or for higher accuracy, the ToF 3D sensing could be preferred) or the light steering device could be used only to explore the area predetermined by the 2D sensor just concentrating on the region where an object is detected or the region where objects within a certain depth range of interest are identified.

Using dual cameras can facilitate reliable 2D segmentation. Dual cameras make it easier to separate between objects in the scene. Dual cameras can also be used to sense depth by e.g., parallax phenomenon. Using algorithms with the appropriate sensors, depth information can be extracted from dual cameras and used in various applications.

In some embodiments, a 2D image can be formed by other ways. For example, a single pixel detector, can be used to form a 2D image.

In embodiments, other 3D sensors such as an acoustic imager or RADAR imager may be used in combination with the ToF depth sensor.

The time-of-flight imaging system 100 of FIG. 1 illustrates two ancillary system imagers (140*a*, 140*b*). Ancillary system imagers 140*a* and 140*b* could be 2D imagers, such as stereoscopic cameras. Ancillary system imagers 140*a* and 140*b* can also be 3D imagers. As mentioned above, one or both of ancillary system imagers 140*a* and 140*b* can be used in the imaging system 100.

In a possible embodiment, imagers 140*a* and 140*b* are optical imagers that can work as a stereo system for estimating depth of objects in a scene. Each imager 140*a* and 140*b* can capture an image. Each captured image can be overlapped. In the overlapped image, objects closer to the cameras will appear displaced while distant objects will overlap. The accuracy can depend on the number of pixels of each imager 140*a* and 140*b*, and the accuracy can be also depend on the distance of the objects from the camera.

In embodiments, prior knowledge of objects of interest (e.g., two people) a stereo photograph can be captured to roughly estimate the distance to a region of the scene that includes the objects of interest, and then explore that region with a higher resolution depth sensing system using the optimum power for the light source.

By initially using a stereo imaging, capturing a rough estimation of a depth map can reduce the scanning area that the higher power depth sensor scans, thereby reducing power usage for the higher resolution depth sensor. In embodiments, the rough estimation of the depth of objects of interest can also inform the ToF system 100 about the optimum power to be used for the light source; reduced power may suit closer objects while a higher power is needed for objects further away. In embodiments, a combination of the two can be used, where the depth of objects in the foreground can be mapped using lower power (e.g., a stereo imager captured image or low power depth sensor image) and the depth of objects in the background can be mapped using higher power (e.g., using a depth sensor at higher power). In some embodiments, the ToF system 100 can determine that exceeding the maximum power for a few points is worth power consumption in order to detect very distant object or objects that may be small (i.e., only taking up a small percentage of pixel resolution).

As mentioned before other 3D sensing technologies such as radar, or acoustic imagers, can be used in combination or not with the described sensors.

Figure 2:
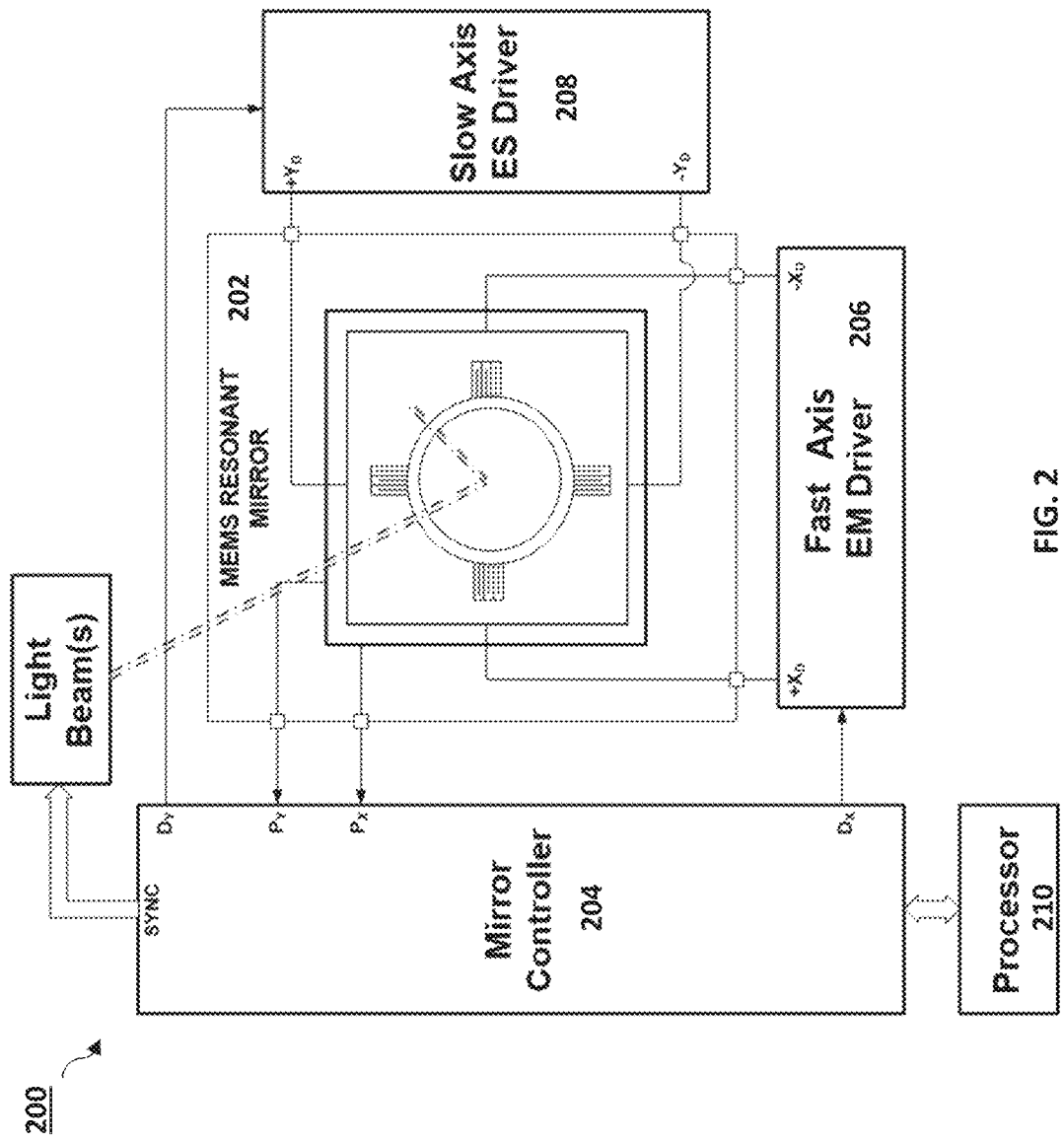
FIG. 2 is a schematic diagram of an example light steering device in accordance with embodiments of the present disclosure.

As mentioned above, light steering device 108 can include a MEMS mirror, an acoustic crystal modulator, a liquid crystal waveguides, optical phase array, etc. FIG. 2 illustrates an example MEMS mirror 200. MEMS mirror 200 can be miniaturized electromechanical device using micro-motors to control the deflection angle of a micro mirror 202 supported by torsion bars. 1D MEMS Mirrors can deflect light along one direction while 2D MEMS mirrors can deflect light along two orthogonal axes. Typical use of 1D MEMS Mirror is a barcode scanner while a 2D MEMS Mirror can be used in pico-projectors, Head-Up-Displays and 3D sensing.

When operating at video frame rates a 2D MEMS Mirror is designed to operate the fast axis (Horizontal pixel scan) in resonant mode while the slow axis (Vertical Line Scan) operates in non-resonant (linear) mode. In resonant mode the MEMS oscillates at its natural frequency, determined by its mass, spring factor and structure, the mirror movement is sinusoidal and cannot be set to be at one specific position. In non-resonant mode the MEMS Mirror position is proportional to the current applied to the micro-motor, in this mode of operation the mirror can be set to stay at a certain position.

The MEMS micro-motor drive can be electrostatic or electromagnetic. Electrostatic drive is characterized by high driving voltage, low driving current and limited deflection angle. Electromagnetic drive is characterized by low driving voltage, high driving current and wider deflection angle. The fast axis is typically driven by a fast axis electromagnetic actuator 206 (because speed and wider FOV are paramount) while the slow axis is driven by a slow axis electrostatic actuator 208 to minimize power consumption. Depending on the MEMS design and application the driving method can change.

In order to synchronize the activation of the light source according to the current mirror position it is necessary for the MEMS mirror to have position sensing so that the mirror controller 204 can adjust the timings and know the exact time to address a pixel or a line. A processor 210 can provide instructions to the controller 204 based on feedback and other information received from the controller 204. The mirror controller 204 can also provide START signals to the light emitter (as shown in FIG. 1).

Embodiment 1: Combine 2D Image Segmentation with 3D Depth Sensing

Aspects of the embodiments are directed to systems and methods that make use of two-dimensional (2D) image data to increase sensing efficiency in acquiring three-dimensional (3D) depth points. In embodiments, segmentation can be used to identify regions of interest (ROI) from the 2D scene where we are interested in obtain depth information or reduce the 3D scanning of certain regions.

Figure 3B:
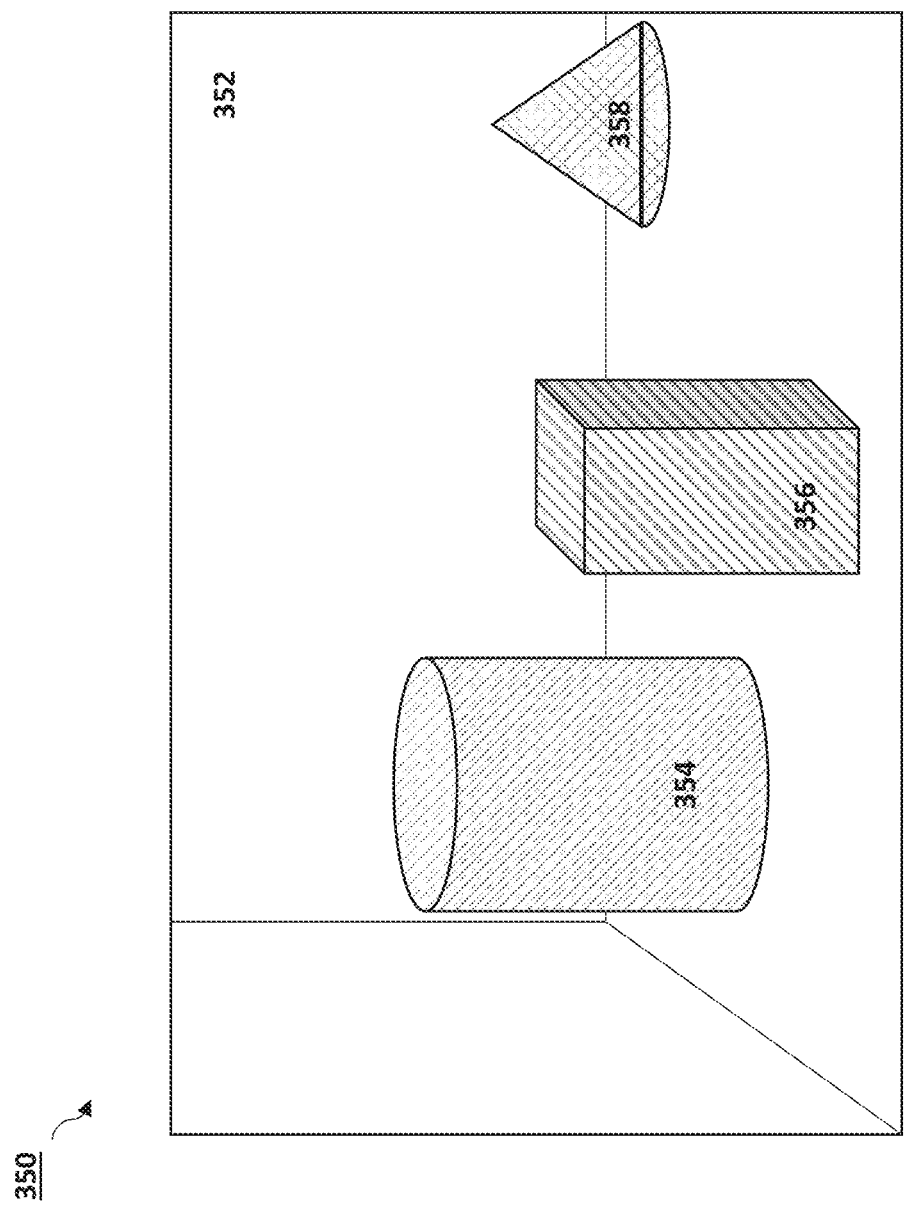
FIG. 3B is a schematic diagram of a segmented 2D image in accordance with embodiments of the present disclosure.

FIG. 3A is a schematic diagram of an image 300 captured by a 2D imaging device in accordance with embodiments of the present disclosure. In the image 300, four "objects" are identified: a wall 302, a cylinder 304, a cuboid 306, and a cone 308. The image 300 can be captured by a conventional 2D image device (such as 2D image device 140a or 140b). FIG. 3B is a schematic diagram of a segmented 2D image 350 in accordance with embodiments of the present disclosure. The wall 352 is shown to be left un-shaded after segmentation (or unidentified as a region of interest). The cylinder 354, the cuboid 356, and the cone 358 are each identified through segmentation as regions of interest.

After the 2D image 300 is segmented, it can be assumed that there exists a topological relation between pixels within the same region of interest. By sampling a subset of pixels within a region of interest, it can be inferred whether the pixels are part of a surface with a given topology that may reduce scanning needs (e.g. flat surface normal to the view. spherical).

FIG. 3C is a schematic diagram of the segmented 2D image 350 of FIG. 3B illustrating example reflected light responses in accordance with embodiments of the present disclosure. The light signal reflected from area A in the background 352 is shown as a flat signal response. Such a flat (or nearly flat) response can be indicative of a constant depth background.

In embodiments, one or more regions of interest from the segmented 2D image can be scanned using a 3D depth sensor. (In this example, the background wall 302/352 can be ignored.) By scanning the regions of interest (or a portion of one or more regions of interest), 3D depth sensing times can be reduced and/or the power it takes to form a 3D depth image or depth map can be reduced. For example, by only scanning the region of interest, or a portion thereof, a depth for an object forming the region of interest can be inferred through the subset of depth points captured for the object. In addition, by scanning on the region of interest, or a portion thereof, the light source used to capture the depth information can be activated only for those areas where depth information is to be captured (e.g., the light emitter can be active only at scanning positions correlating to the region of interest, or portion thereof.

By performing segmentation on the captured 2D image prior or (substantially) simultaneously to depth scanning, the imaging system can decide to skip some of the pixels in the background or certain objects, thereby reducing power consumption or speeding up the acquisition time. Segmentation can also reduce the error in the estimation of the depth of the objects since it is known that a cluster of points 'belong' to the same object—shot noise in depth sensing can be removed and/or the topology of the object can be inferred by a processor on the imaging system, all of which can improve accuracy.

Additionally, segmentation can allow the depth sensor to skip scanning or illuminating areas which are known to be not relevant, which can improve the frame rate and/or reduce power consumption.

Likewise, the process may work in the other direction, too, such that inconsistencies in depth map may suggest incorrect segmentation. Therefore initial segmentation based on 2D images may be refined with 3D information. Additionally, other techniques may be use as exploiting the sharpness/blurriness of a region since they may include information on the depth. This is relevant for objects too far to reflect the laser beam.

In embodiments where video images are recorded, multiple 2D images can be segmented. An object that has moved between the images can be rescanned for depth information, while background and other static portions of the scene can be left unscanned. In a sequence with motion, the 2D imaging system can acquire the scene with a conventional image sensor. The imaging system can identify which object (s) moved from frame to frame. The depth imager can scan the area in each frame where motion/change is detected. This allows the imager to reduce scan time and increase the frame rate, and reduce overall power consumption by only firing the depth imaging light emitter at certain points in the scene. Increasing real-time motion capture frame rates can improve quality of gesture recognition systems, while also reducing power needed to run a device.

In embodiments, the ancillary sensor(s) and the depth sensor are different elements, the information received from each sensor can be coregistered or correlated. In embodiments, a predefined scene can be used to calibrate or correlate the 2D sensor with the 3D sensor. An example scene can include a checkboard where black boxes are deeper than white boxes. The checkboard can be placed at, e.g., two different distances from the sensors platform. The scene captured by the 2D sensor(s) and the depth sensor can be compared, and an inference can be made as to whether there are offsets in the positions of the acquired images and 'how many' 2D pixels are covered by each 'depth' pixel.

For an initial calibration, the entire scene can be scanned. In the event of a recalibration, the camera can focus on a part of the scene (e.g. the center) and use a single distance, thereby speeding the process.

Figure 4A:
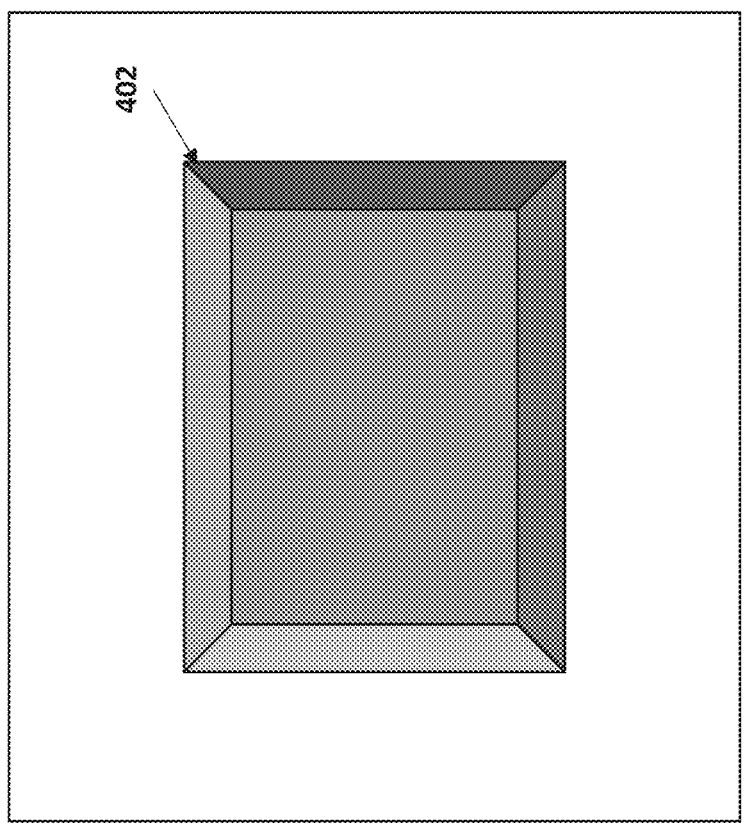
FIG. 4A is a schematic diagram of a conventional 2D image of an object in accordance with embodiments of the present disclosure.
Figure 4B:
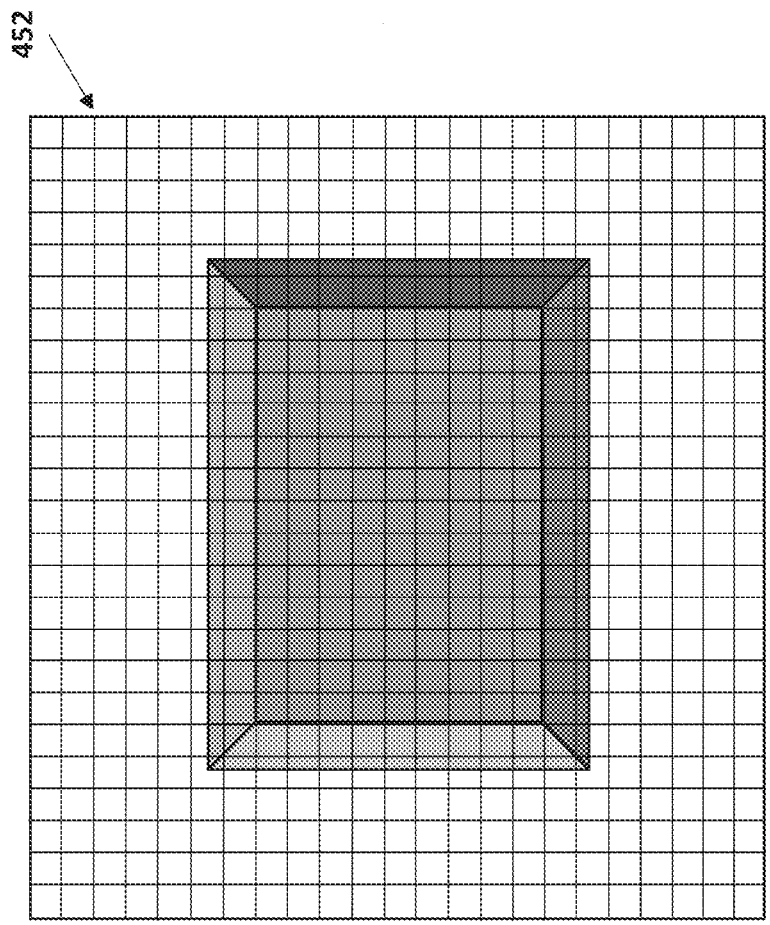
FIG. 4B is a schematic diagram of the conventional 2D image illustrating a high resolution capture of an object in accordance with embodiments of the present disclosure.
Figure 4C:
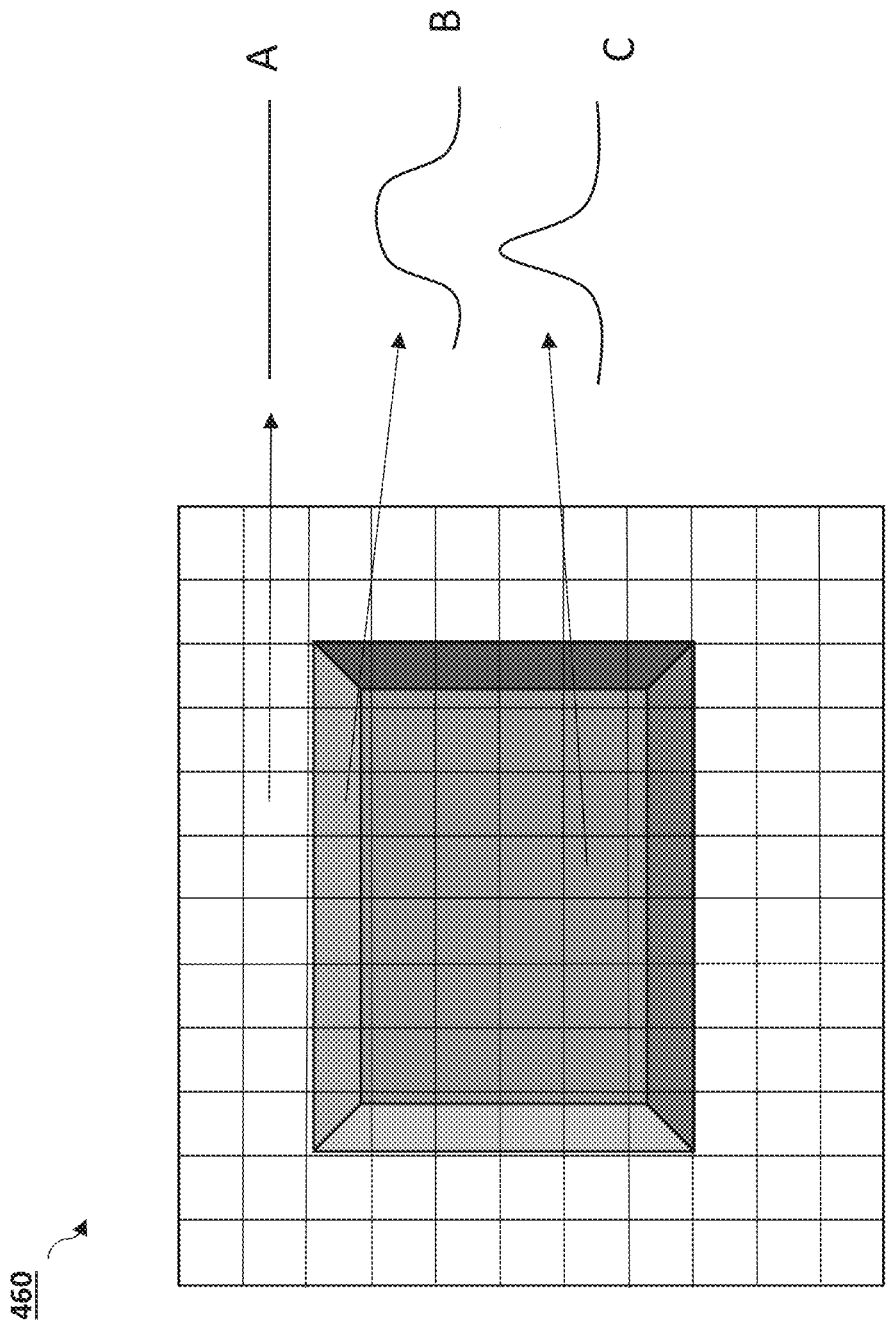
FIG. 4C illustrates a lower resolution depth sensor image in accordance with embodiments of the present disclosure.

In embodiments, using 2D images can help increase the resolution of a depth map. The resolution of the depth map can be increased using the higher resolution information of a conventional sensor. FIG. 4A is a schematic diagram of a conventional 2D image 400 of an object in accordance with embodiments of the present disclosure. The object in this case is a box 402. FIG. 4B is a schematic diagram of the conventional 2D image illustrating a high resolution capture 452 of box 402 in accordance with embodiments of the present disclosure. FIG. 4B illustrates the resolution of the 2D image 400 of the box 402 of FIG. 4A. FIG. 4C illustrates a lower resolution depth sensor image 460 in accordance with embodiments of the present disclosure. In FIG. 4C, three regions are identified: regions A, B, and C. In region A, the background signal is flat or nearly flat—more specifically, a flat signal can imply a background portion of the image. In region C, a single, strong peak is seen, which indicates a single or uniform depth. In region B, the signal is neither flat nor single or strong, like in region C. This type of signal implies that the region B includes a portion of the object that includes a changing depth across the pixel. For example, the top of region B is farther from the camera than the bottom of region B.

Figure 5:
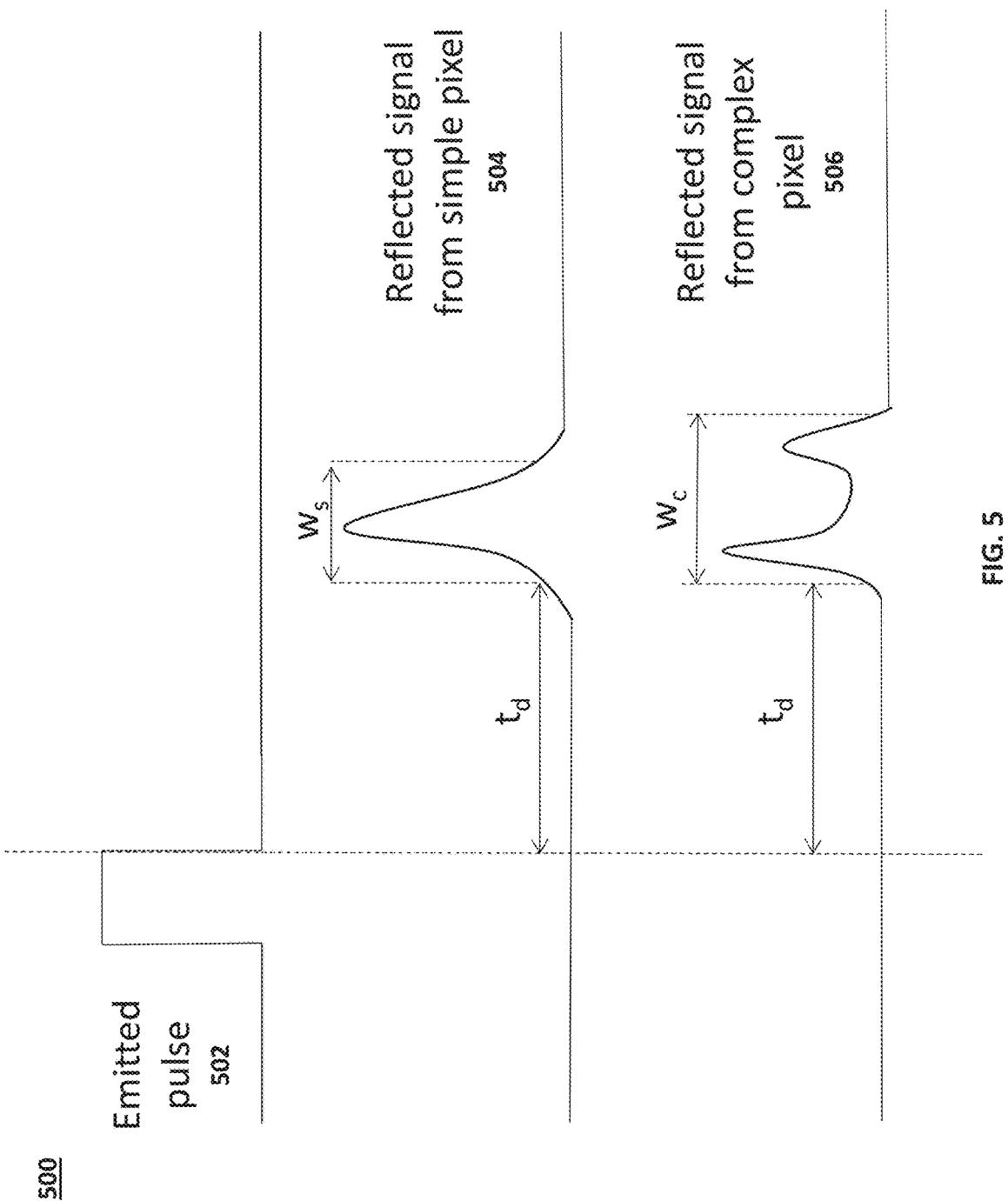
FIG. 5 illustrates timing diagrams for illustrating a simple pixel signal vs a complex pixel signal.

The region B signal can be referred to as a "complex depth pixel"; while the signal from region C can be referred to as a "simple depth pixel". Similar behavior can be seen on FIG. 3C where area C is a "simple depth pixel" while area B is a "complex depth pixel". FIG. 5 illustrates timing diagrams 500 for illustrating a simple pixel signal 504 vs a complex pixel signal 506. At a first time, a light pulse 502 can be emitted from a light emitter. At a second time, $t_d$, a signal representing reflected light from the scene can be received. For a portion of an object that has a uniform depth, the simple signal 504 can be received. The simple signal 504 can include a width $w_s$. For a portion of an object that has a non-uniform depth, a complex signal 506 can be received. The complex signal can have a width $w_c$.

A signal threshold can be selected (e.g., by a user) that represents a signal amplitude, and a signal received above the signal threshold can be considered measured light reflected from an object. A signal threshold width $w_{th}$ can be established to distinguish between a complex depth signal and a simple depth signal. For example, any signal having a signal width greater than $w_t$ and not Gaussian-like can be considered a complex depth signal, and therefore can represent a portion of an object having non-uniform depth (e.g., $w_c > w_{th}$ implies a complex depth signal). Any signal having a signal width less than or equal to $w_t$ can be considered a simple depth signal, and therefore can represent a portion of an object having uniform depth (e.g., $w_s </= w_{th}$ implies a simple depth signal).

The time delay '$t_d$' has predefined allowed maximum and minimum values, which correspond to the closest and furthest distances between an object and the imaging system allowed. A signal width can be defined as the time lapse between the moment when the signal amplitude threshold is exceeded until the signal is definitely below the signal amplitude threshold.

'Threshold', 'Width', 'td_min' and 'td_max' are parameters that may be selected by the user. The analysis of the morphology of a complex depth pixel adds information about its morphology. For example, two separate peaks mean two depths while a wedge would produce a flatter plateau.

The detection of a complex pixel can allow the imaging system to identify areas of the scene that may benefit from additional scanning with finer resolution. In embodiments, the areas with complex pixel signals can be rescanned using the example multiresolution approaches described herein. In embodiments, the complex pixel area can be compared to a corresponding area(s) in the 2D image to estimate an intra-pixel depth structure.

In some embodiments, pansharpening can be used to merge 2D images with 3D depth information. Pansharpening is the fusion of the images captured by lower spatial resolution multispectral and higher spatial resolution panchromatic sensors. The output is an image that has the high spectral resolution of the multispectral image and also the high spatial resolution of the panchromatic image or a trade-off between them. The spatial resolution of the multispectral image is "increased" using the information contained in the panchromatic image. This means that the pansharpened image may have the same number of pixels as the panchromatic image and also the same number of bands as the multispectral image, hence pansharpening can be regarded as an image or sensor fusion process.

In some embodiments, fusing the 2D and 3D images can include a Principal Component Analysis (PCA). First, the up-scaled multispectral image (i.e., the lower resolution depth image that has been up-sampled so it has same size as the conventional 2D image) is transformed using the PCA into a set of uncorrelated components whose number is the same as number of bands in the 3D image. The first principal component has the highest variance and is similar to the higher resolution image itself. The next step is to replace this component with the one from the actual higher resolution image and finally take the inverse transform to get the fused image.

Figure 6A:
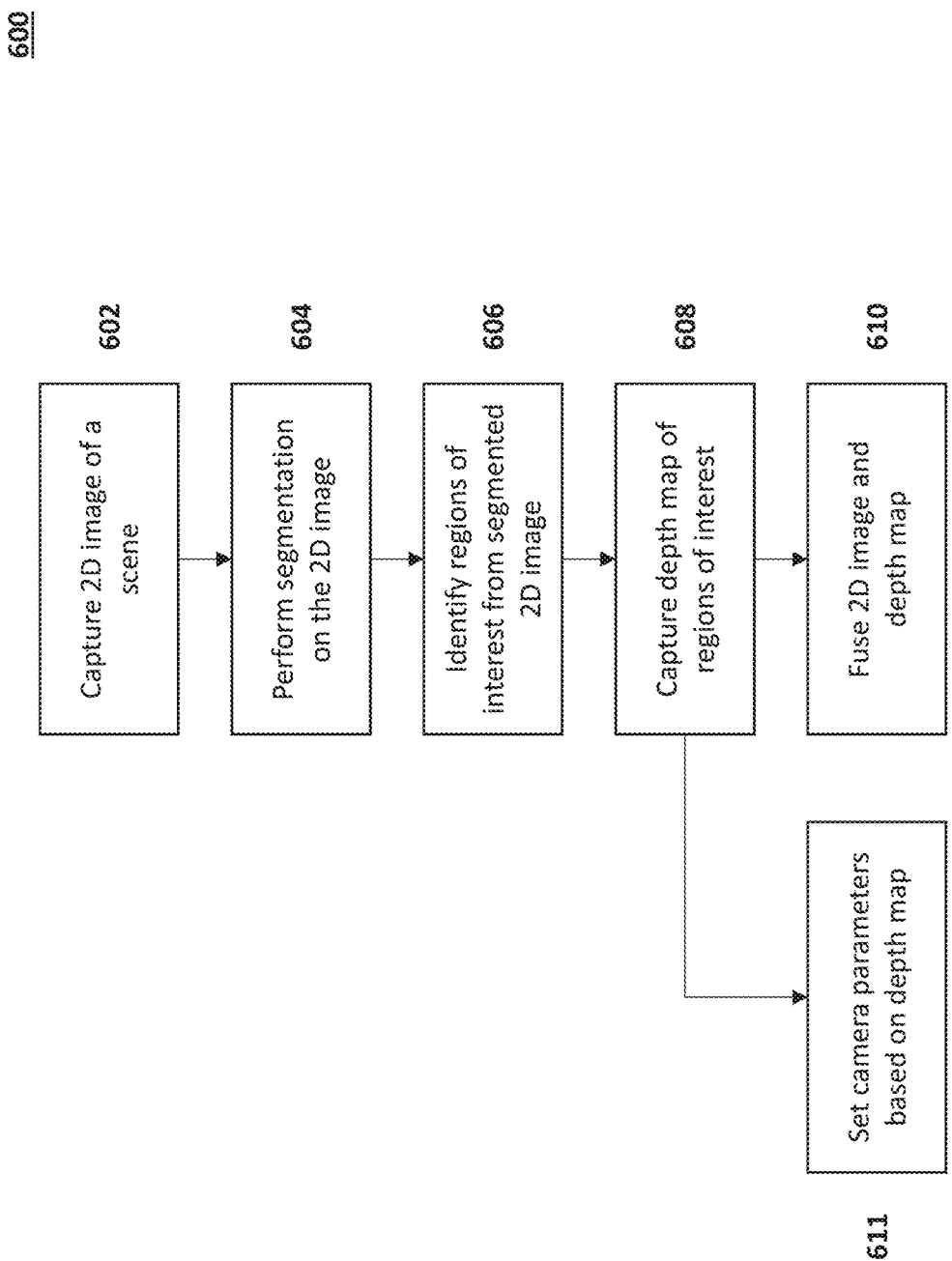
FIG. 6A is a process flow diagram for capturing depth information using a 2D image in accordance with embodiments of the present disclosure.

FIG. 6A is a process flow diagram for capturing depth information using a 2D image in accordance with embodiments of the present disclosure. At the outset, a 2D image sensor can be correlated with a depth sensor. The imaging system can capture a 2D image using a conventional camera system, a dual 2D camera system, or other 2D sensing techniques (602). The captured 2D image can be segmented into regions of interest (604). Regions of interest from the scene can be identified from the segmented 2D image (606). The regions of interest can be scanned with a depth sensor to capture a depth map of the regions of interest (608).

In some embodiments, the depth map can be fused with the 2D image (610). In some embodiments, prior to capturing the 2D image, a full depth scan can be performed on the scene to capture a full depth map of the scene. The full depth map can be used to verify the segmentation of the 2D image.

Additionally, the full depth map can be updated using the low power scans of the regions of interest.

In embodiments a 2D image can be captured (602) and can be fused (610) with a captured depth map (608) without performing segmentation.

In embodiments, the depth map for the region(s) of interest can be used to set camera parameters (611). For example, the 3D depth map can also be used to set focus, zoom, or other imaging parameters. In embodiments, the camera system can use depth information as a parameter for segmentation. Depth information can be used to identify and isolate objects of interest in the scene. Additionally, depth information can be used to differentiate objects that are in close proximity, or are overlapping in 2D projection but in reality are at different depths (e.g., one person standing behind and to the left or right of another person).

In embodiments, depth information can be used for autofocus purposes. Depth information can allow a faster lens adjustment to a proper position without moving the lens multiple times to determine blurriness, evaluating snapshots of regions of interest, or performing processing on multiple images prior to determining a final lens position.

Figure 6B:
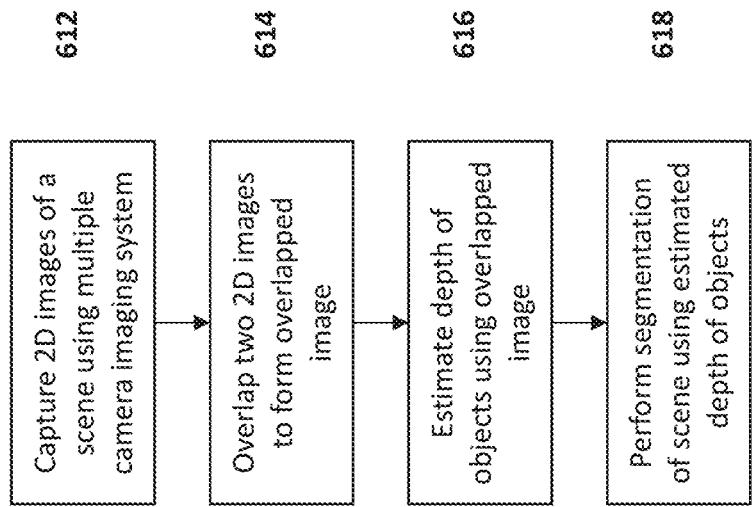
FIG. 6B is a process flow diagram for performing segmentation of a scene using a stereoscopically captured image in accordance with embodiments of the present disclosure.

FIG. 6B is a process flow diagram 650 for performing segmentation of a scene using a stereoscopically captured image in accordance with embodiments of the present disclosure. A stereoscopic imaging system that includes more than one imaging system can capture multiple images of a scene (for simplicity in explanation, each camera of the stereoscopic imaging system can capture one image) (612). The image processor can overlap each image captured by the stereoscopic imaging system (614). The processor can estimate a depth of objects in the overlapping image (616). The image processor can perform segmentation of the objects in the scene based on the estimated depth of objects in the scene (618).

Embodiment 2: Multi-resolution Imaging for Compressing 3D Depth Sensing

Exhaustively scanning a full image with an active laser takes time and power. Typically scenes are sparse, meaning that most information is redundant, especially for pixels adjacent to one another, i.e., neighboring pixels. In embodiments, a scene can be scanned with a depth sensor using a coarse spatial resolution. Depth information can be extracted, and as well as the 'depth complexity' of each pixel. An area covered by each pixel can be revisited using finer resolution depending on any or a combination of the 'depth complexity' of the pixel (indication of how many 'depths' are involved) and the relevance of the area (e.g. based on a prior knowledge of the features of the scene or object defined by the surrounding pixels). Additional factors include the result of a previous segmentation of the 2D image of the scene, changes observed in the 2D image from a previous snapshot of the same scene, and/or the specific application (e.g. gesture recognition vs. high accuracy depth sensing).

The adaptive spatial resolution can be achieved with an iris collimator or just by a proper mirror tilting in the case of using a Spatial Light Modulator (SLM). Advantages are readily apparent, but include faster acquisition time and/or less power consumption in acquiring a depth mapping, or allowing an adaptive trade-off between frame rate and resolution.

Figure 7:
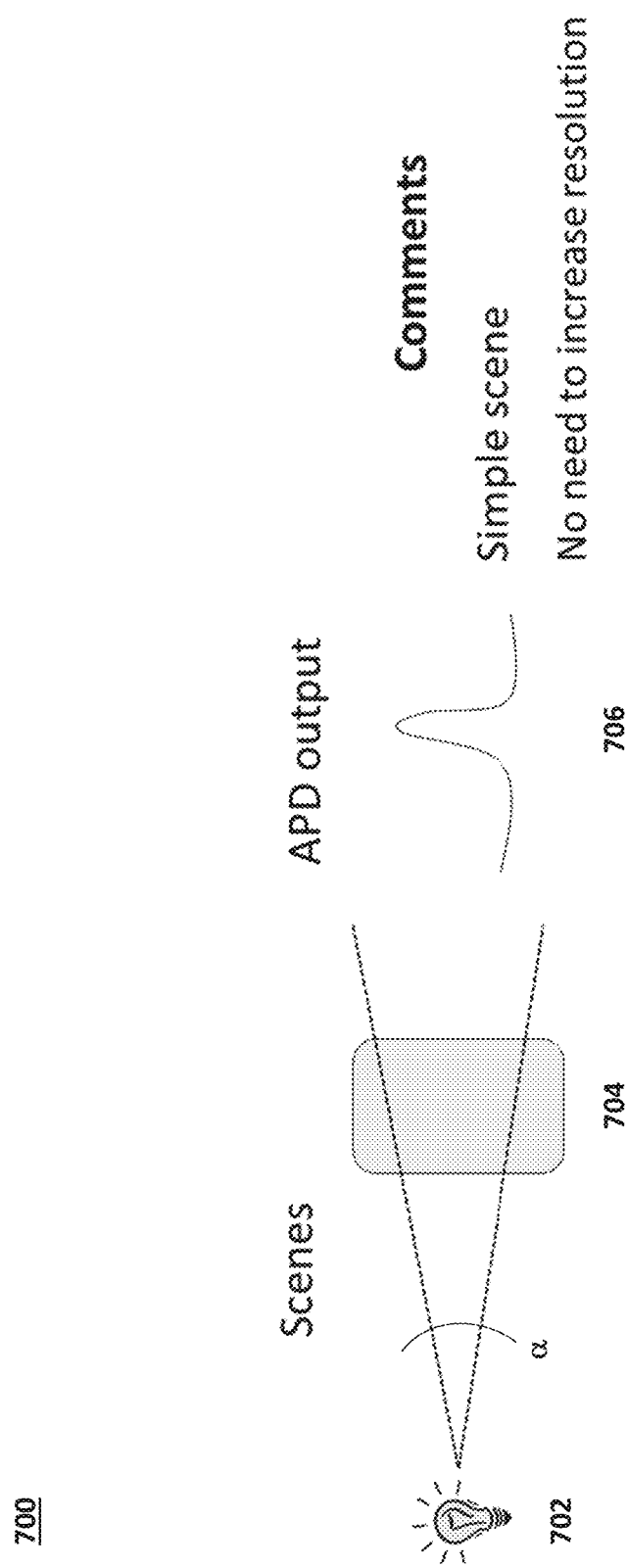
FIG. 7 is a schematic diagram illustrating a simple scene in accordance with embodiments of the present disclosure.

FIG. 7 is a schematic diagram illustrating a simple scene 700 in accordance with embodiments of the present disclosure. In the simple scene 700, a light emitting device 702 emits light pulses at a scanning angle towards an object 704 at a first resolution defined by solid angle $\alpha$. The solid angle $\alpha$ defines the pixel size in two dimensions and, typically, the number of pixels per row of the scene scanned. For a simple scene, the resolution defined by solid angle $\alpha$ is sufficient for receiving depth information for object 704 having a uniform depth. The resulting signal is a simple signal 706, where the term simple is defined above. Receiving a simple signal can imply that the resolution is sufficient to infer depth of the object 704.

FIG. 8A is a schematic diagram illustrating a scene 800 with two objects at different depths in accordance with embodiments of the present disclosure. In the scene 800, there are two objects: a first object 804a and a second object 804b. The first object 804a is at a different depth than the second object 804b. The light emitter 802 can emit light at a first solid angle $\alpha$ directed towards both the first object 804a and the second object 804b. The received light signal can be a complex signal 806 that includes depth information from both the first object 804a and the second object 804b. Receiving a complex signal such as signal 806 can cause the imaging system to infer that an increase in resolution for that pixel can provide additional depth information.

FIG. 8B is a schematic diagram illustrating the scene 800 where the light emitter 802 emits light at a smaller solid angle than in FIG. 8A in accordance with embodiments of the present disclosure. The light emitter 802 emits light at a solid angle $\beta$ towards the first object 804a and the second object 804b. Solid angle $\beta$ is narrower than solid angle $\alpha$ and results in a higher pixel resolution for scanning the objects of the scene or for rescanning regions of interest of each object. By narrowing the solid angle $\beta$, the depth of each object can be resolved independently based on the received simple signal and the timing delay of the received simple signal. For example, light reflected from the first object 804a can result in a first simple signal 808a. Light reflected from the second object 804b can result in a second simple signal 808b. The time delay between each simple signal 808a and 808b can also be determined and used to resolve a difference in depth between the two objects.

Figure 9A:
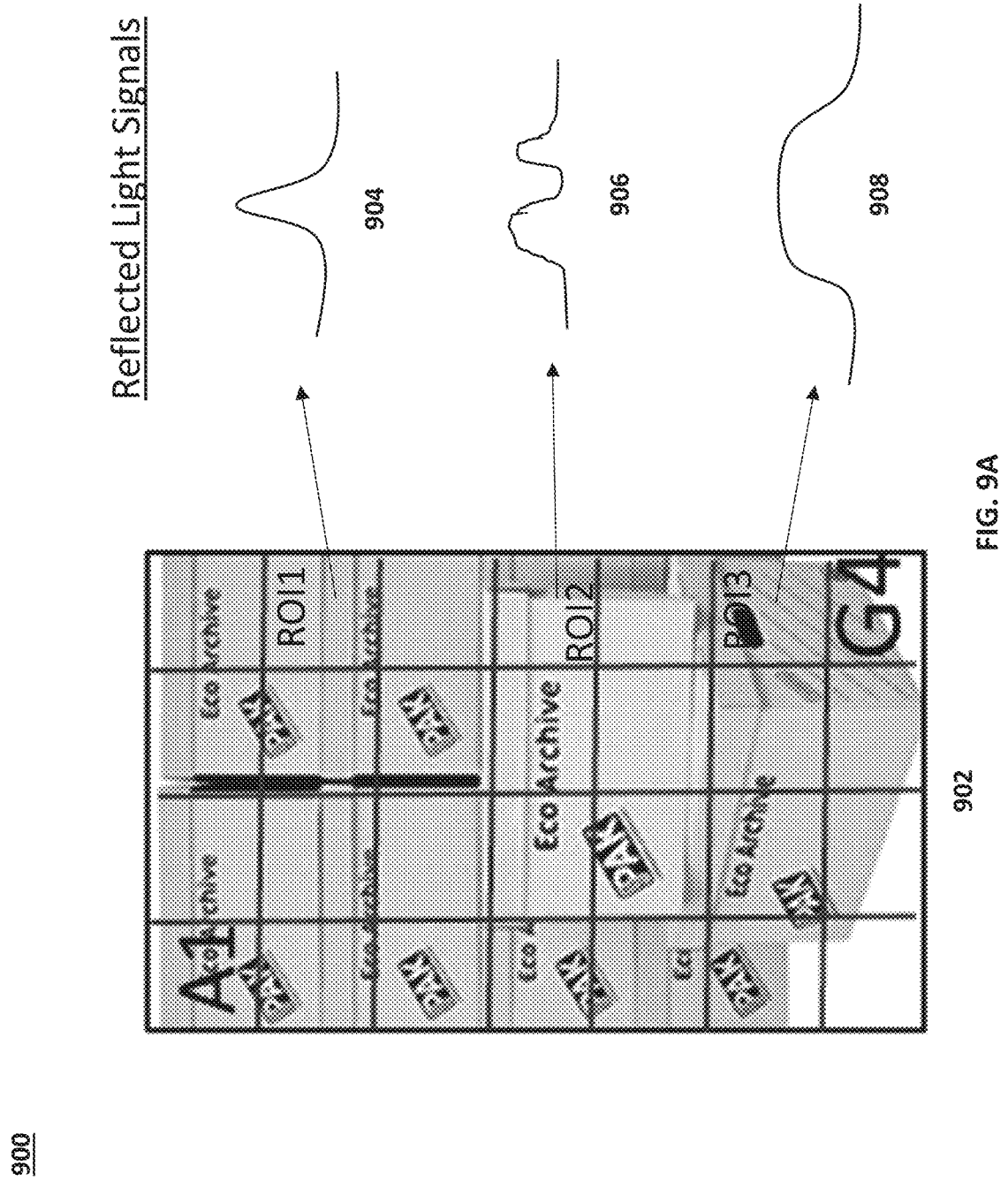
FIG. 9A illustrates a coarse resolution image capture of a scene in accordance with embodiments of the present disclosure.

In embodiments, the solid angle cannot be changed. In those situations, the steps for incrementing the light steering device for scanning the scene can be decreased so that for each coarse pixel, the scanning step between consecutive pixels can be smaller (for example, a 20-25% reduction in step size) than the field of view. Scanning using a reduced step size can result in a redundancy of information captured in neighboring samples. That is, the information resulting in a scan using a reduced step size is simultaneously contained in multiple adjacent samples. FIG. 9A illustrates a coarse resolution image capture of a scene 900 in accordance with embodiments of the present disclosure. The image is scanned using a coarse resolution depth scan, resulting in pixels A1-G4. Three regions of interest are identified from the coarse resolution image capture: ROI1 (pixel B4), ROI2 (pixel D4), and ROI3 (pixel F4). The object in ROI1 is at a uniform depth, and the resulting reflected light signal is a simple signal 904. The object or objects in ROI2 are at different depths, and therefore the resulting reflected light signal is a complex signal 906. In ROI3, the object has a gradual depth (wedge depth), and the resulting light signal is a broad single peaked signal 908.

Figure 9B:
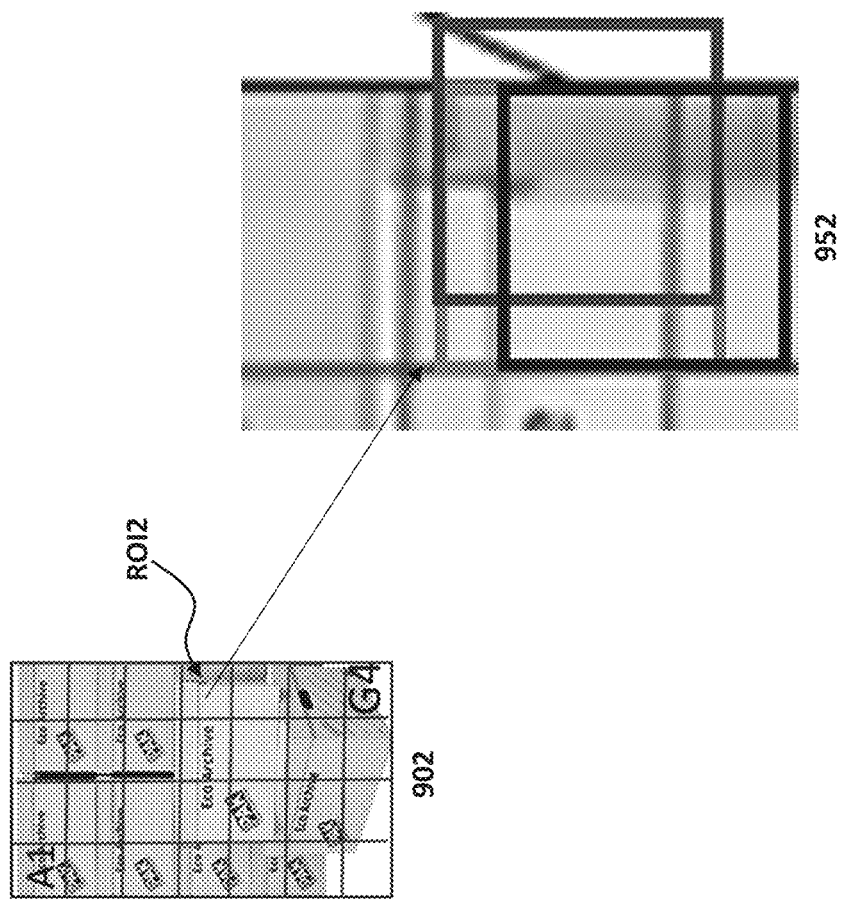
FIG. 9B is a schematic diagram illustrating a high resolution scan achieved by increasing pixel scanning step resolution in accordance with embodiments of the present disclosure.

FIG. 9B is a schematic diagram 950 illustrating a high resolution scan achieved by increasing pixel scanning step resolution in accordance with embodiments of the present disclosure. Instead of increasing the resolution of the pixels, the resolution of each step taken in scanning the pixel can be increased. The advantage to this implementation is that scanning can be stopped as soon as all the depth information in that pixel has been detected.

In some embodiments, the row containing the pixel of interest can be scanned (e.g., depending on the type of light steering device used) using higher resolution steps for each scanned pixel.

Figure 10:
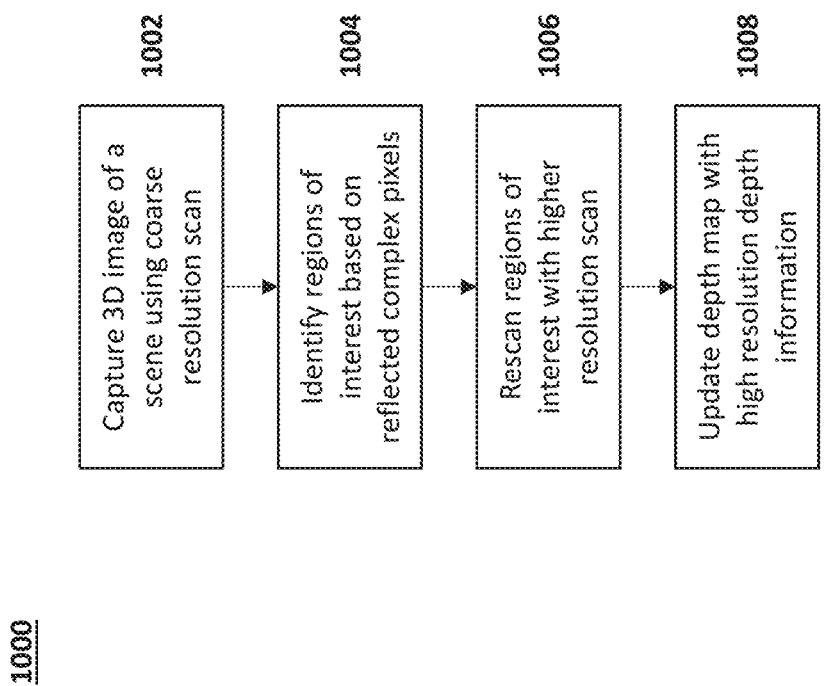
FIG. 10 is a process flow diagram for applying multiresolution to 3D sensing compression.

FIG. 10 is a process flow diagram 1000 for applying multiresolution to 3D sensing optimization. A depth map of a scene can be captured using coarse resolution imaging (1002). One or more regions of interest (ROI) can be determined from the initial coarse depth map (1004). For example, complex signals can indicate regions of interest for performing higher resolution depth sensing. The regions of interest can be scanned using a higher resolution depth sensing technique (1006). The initial, coarse depth map can be updated or enhanced using the higher resolution depth information (1008).

Embodiment 3: Applying Super Resolution to 3D Sensing

In 3D sensing the pixel resolution might be too coarse due to the area illuminated by the laser beam. This area depends on the system (e.g. collimator) but also on the scene (same beam covers less area for closer objects than for distant ones). With some areas covered being broad and ill defined (typically following a Gaussian illumination pattern) a relevant overlap between adjacent areas is expected. A higher overlap can be used to obtain a higher resolution image with Super Resolution techniques.

When a pixel is illuminated (and then receive the reflected light from it), the light distribution from the received, reflected light signal is not fully homogeneous. An overlap between nearby pixels can allow for an inference of a higher resolution depth information.

FIG. 11 illustrates three depth signals representing neighboring pixel values in accordance with embodiments of the present disclosure. When there is no signal overlap between neighboring pixels, finer resolution can be achieved via interpolation. When there is moderate overlap between neighboring pixels, the information in the central pixel is influenced by neighboring pixels. If the central peak indicates the presence of two objects, the boundary between the two pixels can be inferred by looking at neighboring pixels. When there is significant overlap between neighboring pixels, the information in the central pixel is essentially contained in its neighbors. The information for the central pixel or the boundary conditions can be decoupled (deconvolved) from the neighbor acquisitions and obtain a finer step (e.g., by stepping through the pixels using a smaller resolution scanning step).

Inferences as to obtain sharper borders in ROIs can be inferred from neighboring pixels. Using a high resolution scan can improve the inferences. For example, using a coarse scan, the regions of interest can be determined. In this case, regions of interest can be areas where a boundary condition exists. A boundary condition can be defined here as a location in the scene where two or more depths are seen in a single region or pixel. A higher resolution scan can provide more information about the actual depth values closer to the boundary. The inference can be made, for example in a way similar to sub-pixel mapping. The average depth from each region of interest as measured by the higher resolution scanning can allow for a more precise assignment of depth values at the boundary between neighboring pixels.

What is claimed is:

1. A method for image processing and engendering three-dimensional time-of-flight depth map, the method comprising:
   acquiring a first two-dimensional image of a scene;
   segmenting the first two-dimensional image, whereby segmentation is the process of partitioning a digital image into multiple segments;
   identifying one or more regions of interest of the scene from the segmentation of the first two-dimensional image; and
   capturing a three-dimensional time-of-flight depth map of at least one of the one or more regions of interest, in which the three-dimensional time-of-flight depth map is a subset representative of the first image of the scene.

2. The method of claim 1, wherein regions of interest are data samples within the first two-dimensional image of the scene for a particular purpose of identification.

3. The method of claim 1, wherein acquiring the first image comprises capturing a two-dimensional image of the scene.

4. The method of claim 1, wherein acquiring the first image comprises receiving a captured, two-dimensional image of the scene from an imaging device.

5. The method of claim 1, wherein capturing the time-of-flight depth map comprises:
   identifying one or more sets of pixels that form the at least one region of interest; and
   scanning at least some of the pixels of the one or more sets of pixels that form the at least one region of interest with a three-dimensional imaging device.

6. The method of claim 1, wherein acquiring the first image of the scene comprises capturing a low resolution depth map of the scene.

7. The method of claim 6, further comprising:
   identifying, from the low resolution depth map, one or more regions of interest of at least a portion of the scene;
   scanning the one or more regions of interest with a higher resolution depth scan.

8. The method of claim 7, wherein scanning the one or more regions of interest with a higher resolution depth scan comprises scanning the one or more regions of interest with a narrow solid angle light beam emitted from the imaging device.

9. The method of claim 7, wherein scanning the one or more regions of interest with a higher resolution depth scan comprises scanning the one or more regions of interest with a reduced scanning step size.

10. An imaging system for 3-dimensional depth mapping comprising:
    a first camera configured to acquire a first two-dimensional image of a scene;
    an image processor configured to:
        segment the first two-dimensional image, whereby segmentation is the process of partitioning a digital image into multiple segments;
        identify one or more regions of interest of the scene from the segmentation of the first two-dimensional image, wherein regions of interest are data samples within the first two-dimensional image of the scene for a particular purpose of identification; and
        capture a three-dimensional time-of-flight depth map of at least one of the one or more regions of interest.

11. The imaging system of claim 10, wherein regions of interest are data samples within the first two-dimensional image of the scene for a particular purpose of identification.

12. The imaging system of claim 10, wherein acquiring the first image comprises capturing a two-dimensional image of the scene.

13. The imaging system of claim 10, wherein acquiring the first image comprises receiving a captured, two-dimensional image of the scene from an imaging device.

14. The imaging system of claim 10, wherein capturing the depth map comprises:
identifying one or more rows of pixels that form the at least one region of interest; and
scanning at least some of the pixels of the one or more rows of pixels that form the at least one region of interest with a three-dimensional imaging device.

15. The imaging system of claim 10, further comprising second camera configured to acquire a second image of the scene;
wherein acquiring the first and second images of the scene comprises deriving a low resolution depth map of the scene using stereo imaging of the first and second images.

16. The imaging system of claim 15, further comprising:
identifying, from the low resolution depth map, one or more regions of interest of at least a portion of the scene;
scanning the one or more regions of interest with a higher resolution depth scan.

17. The imaging system of claim 16, wherein scanning the one or more regions of interest with a higher resolution depth scan comprises scanning the one or more regions of interest with a narrow solid angle light beam emitted from the imaging device.

18. The imaging system of claim 16, wherein scanning the one or more regions of interest with a higher resolution depth scan comprises scanning the one or more regions of interest with a reduced scanning step size.

19. The imaging system of claim 10, wherein the first camera comprises an adjustable lens and the image processor is configured to:
determine a depth of an object within the region of interest; and
configure the adjustable lens into a focused position for capturing an image of the object.

20. The imaging system of claim 10, wherein the time-of-flight imaging system is configured to:
capture a high-resolution depth map of the scene prior to acquiring the first image of the scene;
perform segmentation of the scene based on the high-resolution depth map; and identify one or more regions of interest based on the segmentation of the scene.

21. An apparatus for image processing and engendering three-dimensional time-of-flight depth map, the apparatus comprising:
means for acquiring a first two-dimensional image of a scene;
means for segmenting the first two-dimensional image, whereby segmentation is the process of partitioning a digital image into multiple segments;
means for identifying one or more regions of interest of the scene from the segmentation of the first two-dimensional image; and
means for capturing a three-dimensional time-of-flight depth map of at least one of the one or more regions of interest, in which the three-dimensional time-of-flight depth map is a subset representative of the first image of the scene.

* * * * *